(12) United States Patent
Liu et al.

(10) Patent No.: US 12,382,568 B2
(45) Date of Patent: Aug. 5, 2025

(54) FRACTURING WELL SITE SYSTEM

(71) Applicant: YANTAI JEREH PETROLEUM EQUIPMENT & TECHNOLOGIES CO., LTD., Yantai (CN)

(72) Inventors: Kaishen Liu, Yantai (CN); Shouzhe Li, Yantai (CN); Zhuqing Mao, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 239 days.

(21) Appl. No.: 18/314,312

(22) Filed: May 9, 2023

(65) Prior Publication Data

US 2023/0276560 A1 Aug. 31, 2023

Related U.S. Application Data

(63) Continuation of application No. 17/869,336, filed on Jul. 20, 2022, now Pat. No. 11,683,878, which is a (Continued)

(30) Foreign Application Priority Data

Apr. 7, 2021 (CN) .......................... 202120706298.3

(51) Int. Cl.
*H05F 3/00* (2006.01)
*E21B 43/26* (2006.01)
(Continued)

(52) U.S. Cl.
CPC ........... *H05F 3/02* (2013.01); *E21B 43/2607* (2020.05); *H02G 13/40* (2013.01); *H02H 7/06* (2013.01)

(58) Field of Classification Search
CPC ....... H05F 3/02; E21B 43/2607; H02G 13/40; H02H 7/06
See application file for complete search history.

(56) References Cited

U.S. PATENT DOCUMENTS 3,952,218 A * 4/1976 Deters .................... H02K 5/132
310/71
4,471,233 A 9/1984 Roberts
(Continued)

FOREIGN PATENT DOCUMENTS

| CH | 620059 A5 | 10/1980 |
|----|-----------|---------|
| CN | 202153558 U | 2/2012 |

(Continued)

OTHER PUBLICATIONS

Non-Final Office Action for U.S. Appl. No. 18/167,676 mailed on Dec. 30, 2024.
(Continued)

*Primary Examiner* — Pete T Lee
(74) *Attorney, Agent, or Firm* — Sheppard Mullin Richter & Hampton LLP

(57) ABSTRACT

A fracturing system includes a plurality of electrical apparatuses, a plurality of fuel-driven apparatuses and a grounding system. The grounding system includes a first grounding metal wire, a second grounding metal wire, and a first grounding terminal. The first grounding terminal is spaced from each of the electrical apparatus and the electric-power supply apparatus by one or more distances. Each of the plurality of electrical apparatuses is connected to the first grounding metal wire and is connected to the first grounding terminal through the first grounding metal wire. Each of the plurality of fuel-driven apparatuses is connected to the second grounding metal wire and is connected to the first grounding terminal through the second grounding metal
(Continued)

wire. The first grounding metal wire and the second grounding metal wire are connected to the first grounding terminal in parallel.

20 Claims, 6 Drawing Sheets

Related U.S. Application Data continuation of application No. 17/325,955, filed on May 20, 2021, now Pat. No. 11,596,047.

(51) Int. Cl.
*H02G 13/00* (2006.01)
*H02H 7/06* (2006.01)
*H05F 3/02* (2006.01)

(56) References Cited

U.S. PATENT DOCUMENTS

| | | | |
|---|---|---|---|
| 5,767,591 A | 6/1998 | Pinkerton | |
| 6,069,781 A * | 5/2000 | Wingate | H02H 9/06 361/111 |
| 6,188,552 B1 | 2/2001 | Jaeschke et al. | |
| 6,232,751 B1 | 5/2001 | Farr et al. | |
| 6,397,156 B1 | 5/2002 | Bachmann et al. | |
| 6,535,369 B1 | 3/2003 | Redding et al. | |
| 7,728,583 B2 | 6/2010 | Waters et al. | |
| 7,940,041 B2 | 5/2011 | Waters et al. | |
| 8,798,803 B2 | 8/2014 | Bush et al. | |
| 9,444,232 B2 | 9/2016 | Warren | |
| 10,648,311 B2 | 5/2020 | Oehring et al. | |
| 10,724,343 B2 | 7/2020 | Lucas et al. | |
| 10,753,165 B1 | 8/2020 | Fischer et al. | |
| 10,871,045 B2 | 12/2020 | Fischer et al. | |
| 10,982,498 B1 | 4/2021 | Fischer et al. | |
| 11,114,857 B2 | 9/2021 | Hinderliter et al. | |
| 11,125,034 B2 | 9/2021 | Fischer et al. | |
| 11,156,044 B2 | 10/2021 | Fischer et al. | |
| 11,286,736 B2 | 3/2022 | Fischer et al. | |
| 11,859,482 B2 | 1/2024 | Yeung et al. | |
| 12,078,044 B2 | 9/2024 | Zhong et al. | |
| 2008/0007256 A1 | 1/2008 | Waters et al. | |
| 2010/0201354 A1 | 8/2010 | Waters et al. | |
| 2012/0261986 A1 | 10/2012 | Ichikawa | |
| 2013/0006434 A1 | 1/2013 | Bush et al. | |
| 2013/0306322 A1 | 11/2013 | Sanborn et al. | |
| 2014/0070756 A1 | 3/2014 | Kearns et al. | |
| 2014/0139349 A1 * | 5/2014 | Vilcinskas | E21B 47/008 340/853.1 |
| 2015/0103460 A1 | 4/2015 | Brinner | |
| 2016/0006222 A1 | 1/2016 | Warren | |
| 2016/0013644 A1 | 1/2016 | Mitsutani | |
| 2016/0028229 A1 | 1/2016 | Mitsutani | |
| 2016/0079684 A1 | 3/2016 | Naganishi et al. | |
| 2017/0237383 A1 | 8/2017 | Buffenbarger et al. | |
| 2017/0331203 A1 | 11/2017 | Mundle | |
| 2018/0248351 A1 | 8/2018 | Vail et al. | |
| 2019/0218890 A1 | 7/2019 | Lucas et al. | |
| 2019/0234146 A1 | 8/2019 | Weightman | |
| 2020/0340313 A1 | 10/2020 | Fischer et al. | |
| 2021/0108473 A1 | 4/2021 | Fischer et al. | |
| 2021/0130113 A1 | 5/2021 | Shepherd | |
| 2021/0222503 A1 | 7/2021 | Fischer et al. | |
| 2021/0301608 A1 | 9/2021 | Fischer et al. | |
| 2022/0042385 A1 | 2/2022 | Fischer et al. | |
| 2022/0220816 A1 | 7/2022 | Fischer et al. | |

FOREIGN PATENT DOCUMENTS

| | | |
|---|---|---|
| CN | 102668301 A | 9/2012 |
| CN | 102200589 B | 4/2013 |
| CN | 203289378 U | 11/2013 |
| CN | 203967261 U | 11/2014 |
| CN | 204060629 U | 12/2014 |
| CN | 207530121 U | 6/2018 |
| CN | 106655055 B | 7/2018 |
| CN | 207781218 U | 8/2018 |
| CN | 109779373 A | 5/2019 |
| CN | 208939165 U | 6/2019 |
| CN | 210722532 U | 6/2020 |
| CN | 210838137 U | 6/2020 |
| CN | 111404033 A | 7/2020 |
| CN | 210919013 U | 7/2020 |
| CN | 112018696 A | 12/2020 |
| CN | 112145142 A | 12/2020 |
| CN | 112265475 A | 1/2021 |
| CN | 214429328 U | 10/2021 |
| EP | 0978919 A2 | 2/2000 |
| EP | 3301775 A1 | 4/2018 |
| JP | 2001167814 A | 6/2001 |
| JP | 2022100785 A | 7/2022 |
| WO | 9419860 A1 | 9/1994 |
| WO | 2014189054 A1 | 11/2014 |

OTHER PUBLICATIONS

Non-Final Office Action for U.S. Appl. No. 17/869,526 mailed on Dec. 4, 2024.

Non-Final Office Action for U.S. Appl. No. 17/325,955 mailed on Aug. 15, 2022.

Final Office Action for U.S. Appl. No. 17/869,336 mailed on Dec. 27, 2022.

The Britannica Dictionary, "wire", https://www.britannica.com/dictionary/wire, retrived on Dec. 20, 2022.

D&F Liquidators, "Understanding Electrical Grounding and How it Works", https://www.dfliq.net/blog/understanding-electrical-grounding/, retrieved on Dec. 20, 2022.

Notice of Allowance for U.S. Appl. No. 17/869,526 mailed on Mar. 19, 2025.

Notice of Allowance for U.S. Appl. No. 18/167,676 mailed on Apr. 15, 2025.

* cited by examiner

FRACTURING WELL SITE SYSTEM

CROSS-REFERENCE OF RELATED APPLICATIONS

The present application is a continuation of U.S. patent application Ser. No. 17/869,336 filed on Jul. 20, 2022, entitled "FRACTURING WELL SITE SYSTEM," which is a continuation application of U.S. patent application Ser. No. 17/325,955 filed on May 20, 2021, entitled "FRACTURING WELL SITE SYSTEM," which claims priority of the Chinese Utility Model Application No. 202120706298.3 filed on Apr. 7, 2021. All of the above-referenced applications are hereby incorporated by reference in their entirety.

TECHNICAL FIELD

Embodiments of the disclosure relate to a fracturing well site system.

BACKGROUND

Fracturing refers to a method of forming fractures in underground oil-gas layer by hydraulic action in the process of exploiting oil and gas, and is also known as hydraulic fracturing. With the exploitation of shale gas in recent years, large-scale fracturing operation has gradually developed and adopted. Most of the fracturing operations are based on a diesel-driven apparatus, and the diesel-driven apparatus has the disadvantages of low power density, high noise and large environmental pollution. In view of the above problems, a well site operation system is developed, in which an electric-driven apparatus is mainly used and the diesel-driven apparatus severs as an auxiliary apparatus. The electric-driven apparatus uses the power supplied from electric-power supply apparatus, and the electric-power supply apparatus often is an electric motor, which has high power density, low noise and no waste pollution. However, the well site using the electric-driven apparatus uses high-voltage electricity as the power, accidents such as fire and explosion caused by electric shock may occur.

SUMMARY

Embodiments of the disclosure provides a fracturing well site system, comprising an electric-driven apparatus, a fuel-driven apparatus, an electric-power supply apparatus and a grounding system. The grounding system comprises a first grounding terminal which is spaced from each of the electric-driven apparatus, the fuel-driven apparatus and the electric-power supply apparatus by a preset distance. The fuel-driven apparatus and at least one of the electric-driven apparatus and the electric-power supply apparatus are connected to the first grounding terminal, and the first grounding terminal is configured to ground the fuel-driven apparatus and the at least one of the electric-driven apparatus and the electric-power supply apparatus.

In at least some embodiments, the electric-driven apparatus and the fuel-driven apparatus are connected to the first grounding terminal; the fracturing well site system comprises a plurality of electric-driven apparatuses and a plurality of fuel-driven apparatuses; the grounding system further comprises a first grounding wire and a second grounding wire; each of the plurality of electric-driven apparatuses is connected to the first grounding wire and is connected to the first grounding terminal through the first grounding wire; each of the plurality of fuel-driven apparatuses is connected to the second grounding wire and is connected to the first grounding terminal through the second grounding wire.

In at least some embodiments, the fuel-driven apparatus and the electric-power supply apparatus are connected to the first grounding terminal; the electric-power supply apparatus comprises an electric-power supply device, an electric-power converter device electrically connected with the electric-power supply device, and an electric-power distribution device electrically connected with the electric-power converter device; the fuel-driven apparatus and at least one of the electric-power supply device, the electric-power converter device and the electric-power distribution device are connected to the first grounding terminal.

In at least some embodiments, the fracturing well site system comprises a plurality of fuel-driven apparatuses; the grounding system comprises a second grounding wire and a third grounding wire; each of the plurality of fuel-driven apparatuses is connected to the second grounding wire and is connected to the first grounding terminal through the second grounding wire; the at least one of the electric-power supply device, the electric-power converter device and the electric-power distribution device is connected to the third grounding wire and is connected to the first grounding terminal through the third grounding wire.

In at least some embodiments, the third grounding wire is configured to surround the at least one of the electric-power supply device, the electric-power converter device and the electric-power distribution device, and a planar shape of the third grounding wire is a closed loop.

In at least some embodiments, all of the electric-driven apparatus, the fuel-driven apparatus and the electric-power supply apparatus are connected to the first grounding terminal; the fracturing well site system comprises a plurality of electric-driven apparatuses and a plurality of fuel-driven apparatuses; the electric-power supply apparatus comprises an electric-power supply device, an electric-power converter device electrically connected with the electric-power supply device and an electric-power distribution device electrically connected with the electric-power converter device; the grounding system comprises a first grounding wire, a second grounding wire and a third grounding wire; each of the plurality of electric-driven apparatuses is connected to the first grounding wire and is connected to the first grounding terminal through the first grounding wire; each of the plurality of fuel-driven apparatuses is connected to the second grounding wire and is connected to the first grounding terminal through the second grounding wire; at least one of the electric-power supply device, the electric-power converter device and the electric-power distribution device is connected to the third grounding wire and is connected to the first grounding terminal through the third grounding wire.

In at least some embodiments, the grounding system further comprises a second grounding terminal, and the second grounding terminal is directly connected with at least one of the electric-driven apparatus, the fuel-driven apparatus and the electric-power supply apparatus and is configured to ground the at least one of the electric-driven apparatus, the fuel-driven apparatus and the electric-power supply apparatus.

In at least some embodiments, the third grounding wire is configured to surround the at least one of the electric-power supply device, the electric-power converter device and the electric-power distribution device, and a planar shape of the third grounding wire is a closed loop.

In at least some embodiments, the plurality of electric-driven apparatuses are provided in at least two rows spaced apart from each other in a first direction, each row comprises at least two electric-driven apparatuses provided in a second direction, and the first direction and the second direction are perpendicular to each other; the plurality of the fuel-driven apparatuses are provided in at least two rows spaced apart from each other in the first direction, each row comprises at least two fuel-driven apparatuses provided in the second direction; the first grounding wire is located between the at least two rows of electric-driven apparatuses in the first direction; the second grounding wire is located between the at least two rows of fuel-driven apparatuses in the first direction; the first grounding terminal is located between the first grounding wire and the second grounding wire in the second direction.

In at least some embodiments, the first grounding wire, the second grounding wire and the third grounding wire are provided on the ground and comprise a flat-shaped portion made from a conductive material.

In at least some embodiments, the fracturing well site system further comprises an auxiliary electric-driven apparatus which is connected to the first grounding terminal, and the first grounding terminal is further configured to ground the auxiliary electric-driven apparatus.

In at least some embodiments, the fracturing well site system further comprises an overhead cable, the overhead cable is connected with the electric-power supply apparatus and configured to provide power to the electric-power supply apparatus; the overhead cable comprises a conductive core and a protective layer wrapping the conductive core, and the protective layer comprises a shielding layer; the grounding system further comprises a third grounding terminal, the third grounding terminal is connected with the shielding layer of the overhead cable and configured to ground the shielding layer of the overhead cable.

In at least some embodiments, the electric-driven apparatus comprises one or more of a frequency conversion apparatus, an electric-driven fracturing apparatus, an electric-driven sand mixing apparatus, an electric-driven sand transportation apparatus, an electric-driven meter, an electric-driven chemical additive apparatus and an electric-driven proppant apparatus.

In at least some embodiments, the fuel-driven apparatus comprises a diesel-driven apparatus, and the diesel-driven apparatus comprises one or more of a diesel-driven fracturing apparatus, a diesel-driven sand mixing apparatus and a diesel-driven mixing apparatus.

In at least some embodiments, the fracturing well site system further comprises a lightning protection apparatus, the lightning protection apparatus comprises a main lightning protection apparatus which is provided at a corner of the well site; the grounding system further comprises a fourth grounding terminal, the fourth grounding terminal is connected with the main lightning protection apparatus and configured to ground the main lightning protection apparatus; the fourth grounding terminal is not connected with the first grounding terminal.

In at least some embodiments, the lightning protection apparatus further comprises an auxiliary lightning protection apparatus provided on at least one of the electric-driven apparatus, the fuel-driven apparatus and the electric-power supply apparatus; the auxiliary lightning protection apparatus is grounded through a second grounding terminal directly connected with at least one of the electric-driven apparatus, the fuel-driven apparatus and the electric-power supply apparatus, and a height of the auxiliary lightning protection apparatus relative to the ground is lower than a height of the main lightning protection apparatus relative to the ground.

In at least some embodiments, the first grounding terminal, a second grounding terminal, a third grounding terminal and a fourth grounding terminal are buried under the ground and made from a conductive material, and the conductive material is coated with an anti-corrosion coating.

In at least some embodiments, the electric-power supply apparatus comprises an electric-power supply device, the electric-power supply device comprises at least one of a first electric-power supply and a second electric-power supply; the first electric-power supply is configured to provide a first voltage; the second electric-power supply is configured to provide a second voltage; the first voltage and the second voltage are both in an order of kilovolts, and the first voltage is larger than the second voltage.

In at least some embodiments, the electric-power supply apparatus further comprises: an electric-power converter device electrically connected to the first electric-power supply; and an electric-power distribution device electrically connected to the electric-power converter device and configured to distribute power to the electric-driven apparatus; the first electric-power supply is configured to transmit the first voltage to the electric-power converter device; the electric-power converter device is configured to compare the first voltage with a preset voltage, adjust the first voltage according to a comparison result, and transmit the first voltage after being adjusted to the electric-power distribution device.

In at least some embodiments, the electric-power distribution device is directly electrically connected to the second electric-power supply, and the electric-power distribution device is further configured to distribute the second voltage provided by the second electric-power supply to the electric-driven apparatus.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
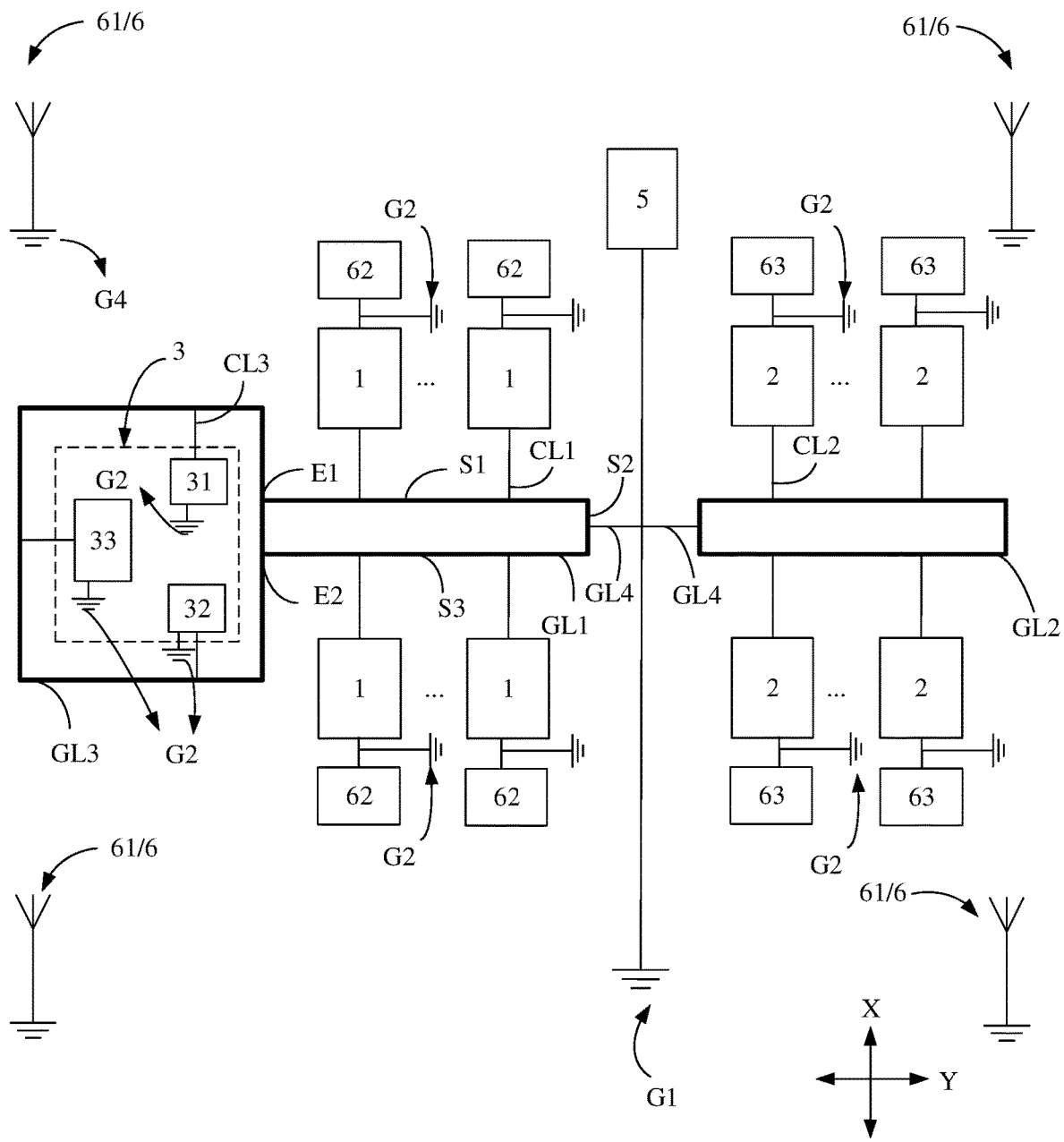
FIG. 1 schematically illustrates a fracturing well site system according to embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Similarly, the terms "a," or "an," etc., do not mean a quantitative limit, but the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

For example, in the electric-driven fracturing well site system, a fuel-driven apparatus, an electric-driven apparatus and an electric-power supply apparatus are respectively grounded through their own grounding devices to avoid electric shock to person and damage to apparatus and wires. However, many electrical apparatuses are provided in the electric-driven fracturing well site, the electrical apparatuses being grounded one by one is not only troublesome to operate, but also has potential safety problem when the grounding of the electrical apparatus is at a position close to the electrical apparatus itself.

The embodiments of the disclosure provide a fracturing well site system, the fracturing well site system includes an electric-driven apparatus, a fuel-driven apparatus, an electric-power supply apparatus, and a grounding system. The grounding system includes a first grounding terminal, and the first grounding terminal is spaced from each of the electric-driven apparatus, the fuel-driven apparatus and the electric-power supply apparatus by a preset distance. The fuel-driven apparatus and at least one of the electric-driven apparatus and the electric-power supply apparatus are connected to the first grounding terminal, and the first grounding terminal is configured to ground the fuel-driven apparatus and the at least one of the electric-driven apparatus and the electric-power supply apparatus.

In the fracturing well site system according to the embodiments of the present disclosure, by connecting the fuel-driven apparatus and at least one of the electric-driven apparatus and the electric-power supply apparatus to the first grounding terminal, the total number of grounding terminals are reduced, and the workload of grounding operation is reduced. Furthermore, by arranging the first grounding terminal at the preset distance from each of the electric-driven apparatus, the fuel-driven apparatus and the electric-power supply apparatus, leakage current, static charge and the like possibly generated by the above apparatuses are introduced to a position far away from the above apparatuses, thereby further improving the safety of the grounding system and ensuring the normal operation of each apparatus in the well site.

In the embodiments of the present disclosure, connecting the fuel-driven apparatus and at least one of the electric-driven apparatus and the electric-power supply apparatus to the first grounding terminal means that: the fuel-driven apparatus and the at least one of the electric-driven apparatus and the electric-power supply apparatus are connected to the same first grounding terminal. For example, it includes the following three cases: 1) the electric-driven apparatus and the fuel-driven apparatus are connected to the same first grounding terminal; 2) the electric-power supply apparatus and the fuel-driven apparatus are connected to the same first grounding terminal; 3) the electric-driven apparatus, the electric-power supply apparatus and the fuel-driven apparatus are all connected to the same first grounding terminal. Please refer to the following detailed description of the three cases.

In the embodiments of the disclosure, the "preset distance" refers to the distance satisfying the safety requirements of the fracturing well site system. For example, the first grounding terminal is provided at a position, of the fracturing well site, far away from electric-driven apparatus, the fuel-driven apparatus and the electric-power supply apparatus, for example, is provided at an edge of the well site. For example, the distance from the first grounding terminal to the electric-driven apparatus is a first distance, the distance from the first grounding terminal to the fuel-driven apparatus is a second distance, the distance from the first grounding terminal to the electric-power supply apparatus is a third distance, and each of the first distance, the second distance and the third distance is greater than or equal to the preset distance.

Generally, the earth has a relatively large resistivity, and different positions of the earth have different potentials if a current flows through the earth. After the current flows into the earth through the grounding terminal, the current spreads from the ground position in a form of current field; the farther away from the grounding position is, the larger the hemispherical current spreading area is, and the smaller the current density in the earth is. Therefore, it is considered that the current density in the earth is close to zero at a position far away from the grounding position, and the potential is already a zero potential at the position far away from the grounding position. Because each of the first distance, the second distance and the third distance is greater than or equal to the preset distance, the leakage current and static charge which are possibly generated by the electric-driven apparatus, the fuel-driven apparatus or the electric-power supply apparatus are led to the remote position of the well site, thereby further improving the safety of the grounding system and ensuring the normal operation of each apparatus in the well site. For example, the preset distance is set to be 50 m 5 km; further, for example, 100 m to 1 km.

The disclosure will be explained by several specific examples as follows. In order to keep the following description of the embodiments of the present disclosure clearer and more concise, detailed descriptions of known functions and known components may be omitted. When any component of the embodiments of the present disclosure is illustrated in more than one drawing, the component is denoted by the same reference numeral in each drawing.

FIG. 1 schematically illustrates the fracturing well site system according to the embodiments of the present disclosure. As shown in FIG. 1, the fracturing well site system includes a plurality of electric-driven apparatuses 1, a plurality of fuel-driven apparatuses 2, an electric-power supply apparatus 3, and a grounding system. For example, the grounding system includes a first grounding terminal G1, which is spaced from each of the electric-driven apparatuses 1, the fuel-driven apparatuses 2 and the electric-power supply apparatus 3 by a preset distance. The electric-driven apparatuses 1, the fuel-driven apparatuses 2 and the electric-power supply apparatus 3 for example are all connected to the same first grounding terminal G1.

The electric-driven apparatuses 1, the fuel-driven apparatuses 2 and the electric-power supply apparatus 3 are all connected to the same first grounding terminal G1, which not only reduces the total number of the grounding terminals and the workload of the grounding operation, but also leads the leakage current and static charge possibly generated by the electric-driven apparatuses 1, the fuel-driven apparatuses 2 and the electric-power supply apparatus 3 to the remote position of the well site, thereby further ensuring the normal operation of each apparatus in the well site.

FIG. 1 illustrates only the case 3) described above. It can be understood that in the embodiments of the present disclosure (referring to FIG. 2 and FIG. 3), the electric-driven apparatuses 1, the fuel-driven apparatuses 2 and the electric-power supply apparatus 3 adopt the grounding manners in cases 1) and 2).

Figure 2:
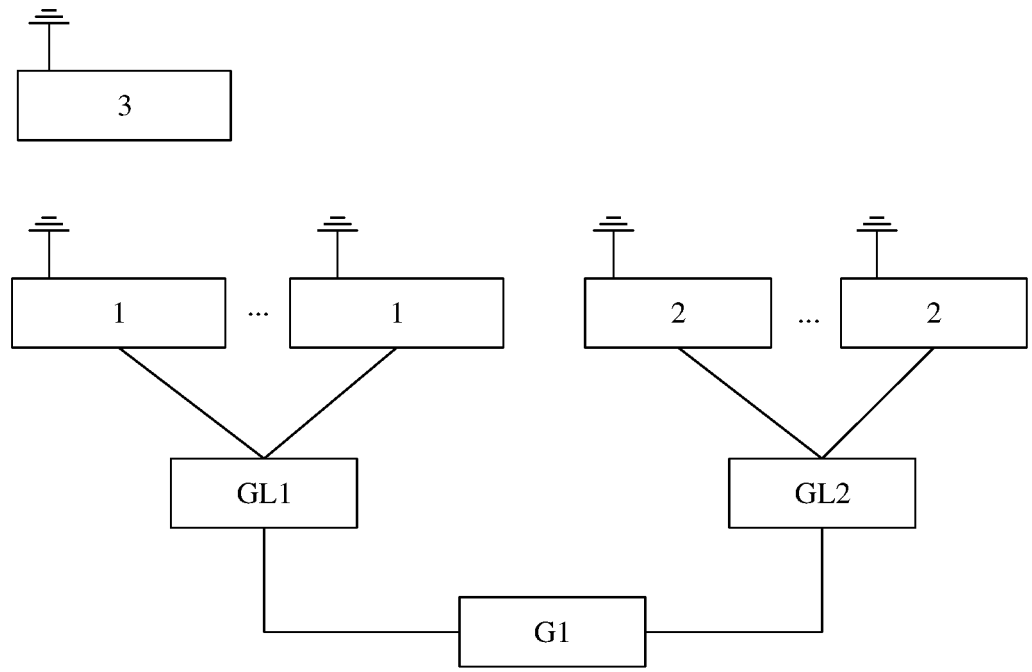
FIG. 2 schematically illustrates a ground system according to the embodiments of the present disclosure.

FIG. 2 schematically illustrates the grounding system according to the embodiments of the present disclosure. For example, as shown in FIG. 2, the fracturing well site system includes the plurality of electric-driven apparatuses 1, the plurality of fuel-driven apparatuses 2, the electric-power supply apparatus 3 and the grounding system. The grounding system includes the first grounding terminal G1. The plurality of electric-driven apparatuses 1 and the plurality of fuel-driven apparatuses 2 are connected to the same first grounding terminal G1. That is to say, the plurality of electric-driven apparatuses 1 and the plurality of fuel-driven apparatuses 2 share the same first grounding terminal G1, which reduces the total number of the grounding terminals used in the well site.

As shown in FIG. 2, the grounding system further includes a first grounding wire GL1 and a second grounding wire GL2. Each of the plurality of electric-driven apparatuses 1 is connected to the first grounding wire GL1 and is connected to the first grounding terminal G1 through the first grounding wire GL1. Each of the plurality of fuel-driven apparatuses 2 is connected to the second grounding wire GL2 and is connected to the first grounding terminal G1 through the second grounding wire GL2. In FIG. 2, by separating the first grounding wire GL1 connected to the electric-driven apparatuses 1 from the second grounding wire GL2 connected to the fuel-driven apparatuses 2, mutual interference between the electric-driven apparatuses 1 and the fuel-driven apparatuses 2 in a fault state is avoided, and the grounding system is more stable. For example, in the case that the first grounding wire GL1 connected with the electric-driven apparatuses 1 breaks down and causes electric leakage, the grounding of the fuel-driven apparatuses 2 is not affected, thereby ensuring the normal operation of the fuel-driven apparatuses 2.

Figure 3:
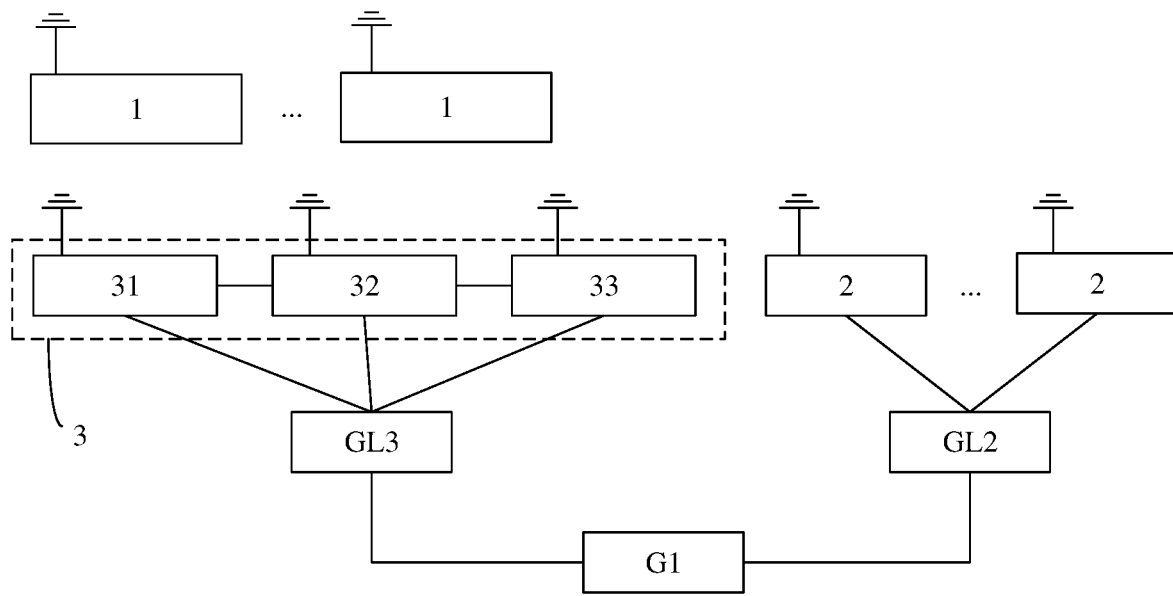
FIG. 3 schematically illustrates another grounding system according to the embodiments of the present disclosure.

FIG. 3 schematically illustrates another grounding system according to the embodiments of the present disclosure. For example, as shown in FIG. 3, the fracturing well site system includes the plurality of electric-driven apparatuses 1, the plurality of fuel-driven apparatuses 2, the electric-power supply apparatus 3 and the grounding system. The grounding system includes the first grounding terminal G1, and the plurality of fuel-driven apparatuses 2 and the electric-power supply apparatuses 3 are connected to the same first grounding terminal G1. For example, the electric-power supply apparatus 3 includes an electric-power supply device 31, an electric-power converter device 32 electrically connected to the electric-power supply device 31, and an electric-power distribution device 33 electrically connected to the electric-power converter device 32. Each of the electric-power supply device 31, the electric-power converter device 32, and the electric-power distribution device 33 and each of the plurality of fuel-driven apparatuses 2 are connected to the same first grounding terminal G1. That is, each of the electric-power supply device 31, the electric-power converter device 32 and the electric-power distribution device 33 and each of the fuel-driven apparatuses 2 share the same first grounding terminal G1, which reduces the total number of the grounding terminals, thereby reducing the difficulty and complexity of the grounding operation.

In FIG. 3, each of the electric-power supply device 31, the electric-power converter device 32, and the electric-power distribution device 33 is connected to the first grounding terminal G1. It can be understood that in other embodiments of the present disclosure, at least one of the electric-power supply device 31, the electric-power converter device 32 and the electric-power distribution device 33 is connected to the first grounding terminal G1; alternatively, at least two of the electric-power supply device 31, the electric-power converter device 32 and the electric-power distribution device 33 are connected to the first grounding terminal G1. In the case that each of the electric-power supply device 31, the electric-power converter device 32, and the electric-power distribution device 33 is connected to the first grounding terminal G1, the safety of the whole electric-power supply apparatus is further improved, and thus such case is preferable.

As shown in FIG. 3, the grounding system further includes the second grounding wire GL2 and a third grounding wire GL3. Each of the plurality of fuel-driven apparatuses 2 is connected to the second grounding wire GL2 and is connected to the first grounding terminal G1 through the second grounding wire GL2. Each of the electric-power supply device 31, the electric-power converter device 32 and the electric-power distribution device 33 is connected to the third grounding wire GL3 and is connected to the first grounding terminal G1 through the third grounding wire GL3.

In FIG. 3, each of the electric-power supply device 31, the electric-power converter device 32 and the electric-power distribution device 33 is connected to the first grounding terminal G1 through the third grounding wire GL3. It can be understood that in other embodiments of the disclosure, at least one of the electric-power supply device 31, the electric-power converter device 32 and the electric-power distribution device 33 is connected to the first grounding terminal G1 through the third grounding wire GL3; alternatively, at least two of the electric-power supply device 31, the electric-power converter device 32 and the electric-power distribution device 33 are connected to the first grounding terminal G1 through the third grounding wire GL3, so as to achieve the above purpose of the disclosure. In the case that each of the electric-power supply device 31, the electric-power converter device 32 and the electric-power distribution device 33 is connected to the first grounding terminal G1 through the third grounding wire GL3, when any one of the electric-power supply device 31, the electric-power converter device 32 and the electric-power distribution device 33 breaks down (e.g., leaks current), adverse interference to the other two apparatuses is avoided, thereby ensuring the normal operation of the other two apparatuses, and thus such case is preferable.

In the fracturing well site system shown in FIG. 3, the third grounding wire GL3 connected to the electric-power supply apparatus 3 and the second grounding wire GL2 connected to the fuel-driven apparatuses 2 are separated from each other, so that mutual interference between the electric-power supply apparatus 3 and the fuel-driven apparatuses 2 in a fault state is avoided, and the grounding system is more stable. For example, in the case that the third grounding wire GL3 connected to the electric-power supply apparatus 3 breaks down and causes currently leakage, the grounding of the fuel-driven apparatuses 2 are not affected, thereby ensuring the normal operation of the fuel-driven apparatuses 2.

In at least some embodiments, for example, the third grounding wire is configured to surround at least one of the electric-power supply device, the electric-power converter device and the electric-power distribution device, which enhances the grounding protection of the electric-power supply apparatus. For example, the third grounding wire is configured to surround one of the electric-power supply device, the electric-power converter device and the electric-power distribution device, and the other two devices are located outside a region surrounded by the third grounding wire. The fracturing well site usually uses voltage in the order of kilovolts, in this case, by arrange the grounding wire surround at least one of the electric-power supply apparatus, the electric-power converter device and the electric-power distribution device, the leakage current, the static charge or the lightning current which possibly produced by the devices are led into the ground, and person near the devices is prevented from getting the electric shock, thereby further improving the safety of electric-power supply apparatus.

Further, for example, a planar shape of the third grounding wire is a non-closed shape or a closed shape, such as a closed loop shape. The planar shape of the third grounding wire is the closed loop, so that the leakage current, the static charge or the lightning current which possibly generated in all directions around the device are led into the ground, and thereby further improving the safety of electric-power supply apparatus. In the embodiments of the present disclosure, the closed loop for example has any shape, such as a regular shape or an irregular shape. Examples of closed loop include, but are not limited to, rectangle, circle, triangle, oval, polygon and the like, which are not specifically limited by the embodiments of the present disclosure.

Figure 4:
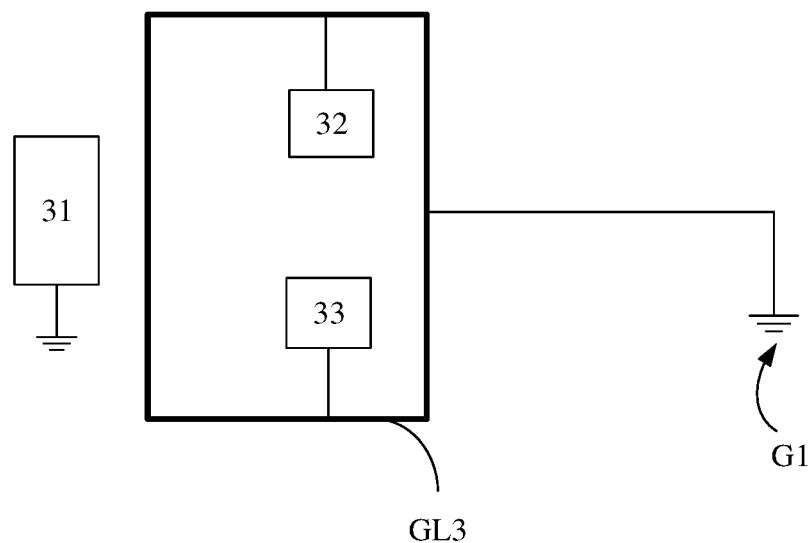
FIG. 4 schematically illustrates a third grounding wire of an electric-power supply apparatus according to the embodiments of the present disclosure.

In at least some embodiments, the third grounding wire is configured to surround at least two of the electric-power supply device, the electric-power converter device and the electric-power distribution device. FIG. 4 schematically illustrates the third grounding wire connected to the electric-power supply apparatus according to the embodiments of the present disclosure. For example, as shown in FIG. 4, the third grounding wire GL3 surrounds the electric-power converter device 32 and the electric-power distribution device 33 to form the closed loop. The electric-power converter device 32 and the electric-power distribution device 33 are connected to the first grounding terminal G1 through the third grounding wire GL3. The electric-power supply device 31 is located outside the region surrounded by the closed loop and adopts a separate grounding terminal. In this case, the third grounding wire GL3 surrounds the electric-power converter device 32 and the electric-power distribution device 33, so that the leakage current, the static charge, the lightning current and the like, which possibly generated by the electric-power converter device 32 and the electric-power distribution device 33, are introduced into the ground to further improve the safety of electric-power supply apparatus. In addition, the electric-power converter device 32 and the electric-power distribution device 33 are connected to the same third grounding wire GL3, the total number of the grounding wires are reduced, and the workload of the well site operation is reduced. Furthermore, the electric-power supply device 31 uses the grounding terminal different from the grounding terminal G1 used by the electric-power converter device 32 and the electric-power distribution device 33, so that grounding interference between the electric-power supply device 31 and each of the electric-power converter device 32 and the electric-power distribution device 33 is avoided.

In at least some embodiments, the third grounding wire is configured to surround the three devices, that is, the electric-power supply device, the electric-power converter device and the electric-power distribution device. For example, as shown in FIG. 1, the third grounding wire GL3 extends along a periphery of the electric-power supply device 31, the electric-power converter device 32, and the electric-power distribution device 33 to form the closed loop. The third grounding wire GL3 is connected to the first grounding terminal G1. Because the third grounding wire GL3 surrounds all the electric-power supply device 31, the electric-power converter device 32 and the electric-power distribution device 33, the leakage current, the static charge or the lightning current, which possibly generated in all directions by these three devices, are introduced into the ground, and the safety of electric-power supply apparatus is further improved. In addition, because the electric-power supply device 31, the electric-power converter device 32 and the electric-power distribution device 33 are connected to the same third grounding wire GL3 and the same grounding terminal G1, the total number of the grounding wires and grounding terminals are reduced, and the workload of well site operation is reduced.

Returning to FIG. 1, the fracturing well site system includes the plurality of electric-driven apparatuses 1, the plurality of fuel-driven apparatuses 2 and the electric-power supply apparatus 3. The electric-power supply apparatus 3 includes the electric-power supply device 31, the electric-power converter device 32 electrically connected to the electric-power supply device 31, and the electric-power distribution device 33 electrically connected to the electric-power converter device 32. The grounding system includes the first grounding wire GL1, the second grounding wire GL2, and the third grounding wire GL3. Each of the electric-driven apparatuses 1 is connected to the first grounding wire GL1 and is connected to the first grounding terminal G1 through the first grounding wire GL1. Each of the fuel-driven apparatuses 2 is connected to the second grounding wire GL2 and is connected to the first grounding terminal G1 through the second grounding wire GL2. The electric-power supply device 31, the electric-power converter device 32, and the electric-power distribution device 33 are connected to the third grounding wire GL3 and are connected to the first grounding terminal G1 through the third grounding wire GL3. Compared with the case where each apparatus is connected to its own grounding terminal, the fracturing well site system according to the embodiments of the disclosure includes the first grounding wire GL1, the second grounding wire GL2 and the third grounding wire GL3, on one hand, the total number of the grounding terminals are reduced and the workload of the grounding operation is reduced; on the other hand, if one of the grounding wires fails due to breakage, the grounding effect of other grounding wires are not affected, thereby ensuring the normal operation of the plurality of apparatuses connected with other grounding wires.

For example, as shown in FIG. 1, the grounding system further includes a plurality of second grounding terminals G2. The plurality of second grounding terminals G2 are directly connected with the electric-driven apparatus 1, the fuel-driven apparatus 2 and the electric-power supply apparatus 3, respectively, and are configured to ground each of the electric-driven apparatus 1, the fuel-driven apparatus 2 and the electric-power supply apparatus 3. For example, taking the electric-driven apparatus 1 as an example, the electric-driven apparatus 1 is provided with a connection wire CL1. For example, a proximal end of the connection wire CL1 is fixedly connected with the electric-driven apparatus 1, and a distal end of the connection wire CL1 is connected with the second grounding terminal G2. The second grounding terminal G2 for example is buried under the ground around the electric-driven apparatus 1 to realize grounding. Through the connection wire CL1, the leakage current or static charge generated by the electric-driven apparatus 1 is led to the second grounding terminal G2. In this way, the electric-driven apparatus 1 is grounded not only through the first grounding terminal G1, but also through the second grounding terminal G2, so that double grounding protection of the electric-driven apparatus 1 is achieved, which further improves the safety and reliability of the electric-driven apparatus 1. Similarly, the fuel-driven apparatus 2 for example is connected to the second grounding terminal G2 through a connection wire CL2. Each of the electric-power supply device 31, the electric-power converter device 32, and the electric-power distribution device 33 of the electric-power supply apparatus 3 is connected to the third grounding terminal G3 through a connection wire CL3.

In the embodiments of the present disclosure, the electric-driven apparatus 1, the fuel-driven apparatus 2 and the electric-power supply apparatus 3 for example adopt a skid-mounted mode or a trailer mode; and different modes may result in that the connection mode between the apparatus and the second grounding terminal is various. For example, taking the electric-driven apparatus 1 as an example, the electric-driven apparatus 1 for example adopts the skid-mounted mode and is fixed on a base of the skid-mounted frame, at this time, the proximal end of the connection wire CL1 is connected to the base of the skid-mounted frame, and the distal end of the connection wire CL1 is connected to the second grounding terminal G2. For example, the electric-driven apparatus 1 adopts the trailer mode, the electric-driven apparatus 1 is movable at any time, at this time, the proximal end of the connection wire CL1 is directly connected to a housing of the electric-driven apparatus 1, and the distal end of the connection wire CL1 is connected to the second grounding terminal G2. Those skilled in the art may select one of the above two connection modes according to actual needs, which is not limited by the embodiments of the present disclosure.

In FIG. 1, each of the electric-driven apparatus 1, the fuel-driven apparatus 2, the electric-power supply device 31, the electric-power converter device 32 and the electric-power distribution device 33 is connected with the corresponding second grounding terminal G2. It can be understood that in other embodiments of the present disclosure, one or more apparatuses among the above apparatuses are selected to be connected with the second grounding terminal according to actual needs. The embodiments of the present disclosure do not limit the total number of the apparatuses that are connected with the second grounding terminal G2.

With continued reference to FIG. 1, for example, the plurality of electric-driven apparatuses 1 are provided in two rows spaced apart from each other in a first direction X (i.e. upper and lower rows of electric-driven apparatuses shown in the figure). Each row of electric-driven apparatuses includes at least two electric-driven apparatuses 1, and the at least two electric-driven apparatuses 1 are provided in the second direction Y. The first direction X and the second direction Y are perpendicular to each other. For example, the plurality of fuel-driven apparatuses 2 are provided in two rows spaced apart from each other in the first direction X (i.e. upper and lower rows of fuel-driven apparatuses shown in the figure). Each row of fuel-driven apparatuses includes at least two fuel-driven apparatuses 2 provided in the second direction Y.

For example, the first grounding wire GL1 is located between the two rows of electric-driven apparatuses in the first direction X. For example, the second grounding wire GL2 is located between the two rows of fuel-driven apparatuses in the first direction X. For example, the first grounding terminal G1 is located between the first grounding wire GL1 and the second grounding wire GL2 in the second direction Y. By adopting the above layout of the apparatuses and grounding wires, on one hand, the first grounding wire GL1 and the second grounding wire GL2 don't cross each other, thereby avoiding the interference between the two grounding wires; on the other hand, an amount of the material for forming the grounding wires is reduced, which reduces the cost of the grounding system of the well site system on the premise of ensuring safety, and improves the space occupancy of the well site system.

In FIG. 1, the plurality of electric-driven apparatuses are provided in two rows and the plurality of fuel-driven apparatuses are provided in two rows; it can be understood that in other embodiments of the present disclosure, the plurality of electric-driven apparatuses or the plurality of fuel-driven apparatuses for example are provided in two rows or more than two rows, which is not limited by the embodiments of the present disclosure.

In addition, the embodiments of the present disclosure do not limit the type of the apparatus in each row. For example, taking electric-driven apparatus as an example, each row of electric-driven apparatus for example includes the same kind of electric-driven apparatus (such as an electric-driven fracturing apparatus), or different kinds of electric-driven apparatus (such as the combination of the electric-driven fracturing apparatus and a frequency conversion apparatus and the like).

In the embodiments of the disclosure, the electric-driven apparatus includes one or more of a frequency conversion apparatus, an electric-driven fracturing apparatus, an electric-driven sand mixing apparatus, an electric-driven sand transportation apparatus, an electric-driven meter, an electric-driven chemical additive apparatus and an electric-driven proppant apparatus. For example, the fuel-driven apparatus includes the apparatus driven by fuel, including but not limited to a diesel-driven apparatus. For example, the diesel-driven apparatus includes one or more of a diesel-driven fracturing apparatus, a diesel-driven sand mixing apparatus and a diesel-driven mixing apparatus.

In at least some embodiments, each of the first grounding wire GL1, the second grounding wire GL2, and the third grounding wire GL3 comprises a plurality of portions. The following description will take the first grounding wire GL1 as an example.

For example, as shown in FIG. 1, the first grounding wire GL1 includes a first portion S1, a second portion S2, and a third portion S3. The first portion S1 and the third portion S3 are provided opposite to each other in the first direction X. The second portion S2 is located between first portion S1 and third portion S3 in the first direction X. For example, the first portion S1, the second portion S2 and the third portion S3 form a U-shape. In the case where the electric-driven apparatuses 1 are provided in two rows, one row of electric-driven apparatuses (for example, the upper row of electric-driven apparatuses shown in the figure) is connected to the first portion S1, the other row of electric-driven apparatuses (for example, the lower row of electric-driven apparatuses shown in the figure) is connected to the third portion S3, and the second portion S2 is connected to the first grounding terminal G1. In the case that the upper row of electric-driven apparatuses are connected to the first portion S1 and the lower row of electric-driven apparatuses are connected to the third portion S3, if one of the first portion S1 and the third portion S3, such as the first portion S1, fails due to the wire breakage, the grounding effect of the third portion S3 is not affected, thereby ensuring the grounding safety of the lower row of electric-driven apparatuses.

In at least some embodiments, the third grounding wire GL3 is directly connected with the first grounding terminal G1, or is connected with the first grounding terminal G1 through other grounding wire. For example, as shown in FIG. 1, the electric-power supply apparatus 3 is disposed on a side of the first grounding wire GL1 away from the second grounding wire GL2, and the third grounding wire GL3 is connected with the first grounding terminal G1 through the first grounding wire GL1. Further, for example, the third grounding wire GL3 is connected to two ends of the first grounding wire GL1, that is, a first end E1 and a second end E2 of the first grounding wire GL1. By adopting the above arrangement, a connection wire from the third grounding wire GL3 to the first grounding terminal G1 is omitted, the amount of the material for forming the grounding wire is reduced, and the cost of the grounding system of the well site is reduced on the premise of ensuring safety.

In at least some embodiments, for example, each of the first grounding wire GL1, the second grounding wire GL2, and the third grounding wire GL3 is disposed on the ground has a flat-shaped portion made from a conductive material. For example, each of the first grounding wire GL1, the second grounding wire GL2, and the third grounding wire GL3 which is made of the conductive material is wrapped by an insulating material. The following description will take the first grounding wire GL1 as an example.

Figure 5:
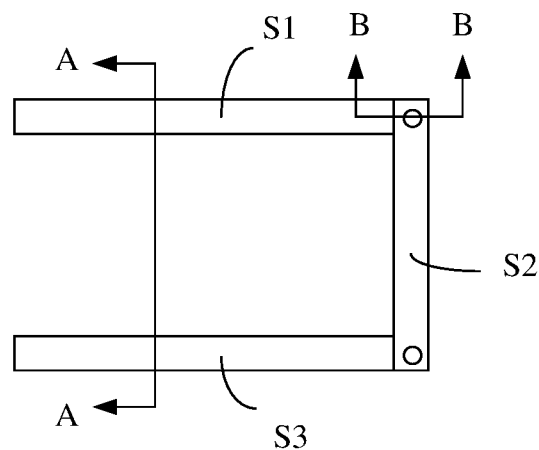
FIG. 5 schematically illustrates a grounding wire according to the embodiments of the present disclosure.
Figure 6:
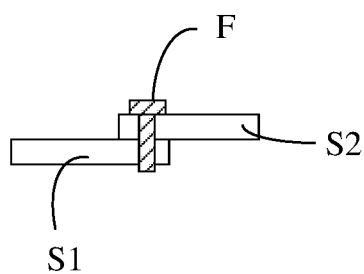
FIG. 6 is a cross-sectional view taken along a line BB of FIG. 5.
Figure 7:
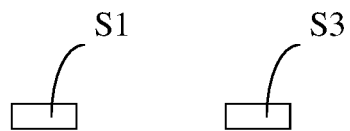
FIG. 7 is a cross-sectional view taken along a line AA of FIG. 5.

FIG. 5 schematically illustrates the grounding wire according to the embodiments of the present disclosure. FIG. 6 is a cross-sectional view taken along the line BB of FIG. 5. FIG. 7 is a cross-sectional view taken along the line AA of FIG. 5.

For example, as shown in FIGS. 5 to 7, the first grounding wire GL1 includes a plurality of flat-shaped portions. For example, each of the first portion S1, the second portion S2 and the third portion S3 comprises a piece of flat-shaped steel, and the plurality of pieces of flat-shaped steel are connected with each other by welding or fasteners F. The fastener F for example is a galvanized bolt. The flat-shaped portion is made from the conductive material such as a metal material. In order to reduce the resistance of the grounding system, the flat-shaped portion is preferably made from flat-shaped galvanized steel or flat-shaped galvanized iron. The cross section of the flat-shaped portion is, for example, rectangular. Considering that the flat-shaped portion should bear a short-circuit current for a certain time in a short-circuit state, a width of the flat-shaped portion is, for example, from 30 mm to 50 mm, preferably 40 mm. A thickness of the flat-shaped portion is from 3 mm to 5 mm, preferably 4 mm.

Returning to FIG. 1, the first grounding wire GL1 and the second grounding wire GL2 for example are connected to the first grounding terminal G1 through a connection wire CL4. In the embodiments of the present disclosure, for example, each of the connection wires CL1, CL2, CL3, CL4 includes an equipotential connection wire. Equipotential connection equalizes potential and reduce contact voltage by proving the equipotential connection wire without adding protective appliances to eliminate the risk of electric shock caused by potential difference, and the equipotential connection is economical and effectively prevents electric shock. For example, the equipotential connection wire includes a metal-core cable, such as a copper-core cable. For example, a diameter of the equipotential connection wire is from 5 mm to 15 mm, preferably 10 mm.

For example, as shown in FIG. 1, the fracturing well site system further includes an auxiliary electric-driven apparatus 5, which is connected to the first grounding terminal G1, and the first grounding terminal G1 is further configured to ground the auxiliary electric-driven apparatus 5. The auxiliary electric-driven apparatus 5 includes other electric power consumption apparatus used in the well site, such as a lighting apparatus and a water pump. By connecting the auxiliary electric-driven apparatus 5 to the first grounding terminal G1 in the well site, it is unnecessary to separately provide a grounding terminal for the auxiliary electric-driven apparatus 5, thereby reducing the total number of the grounding terminals used in the well site and reducing the workload of the grounding operation.

Figure 8:
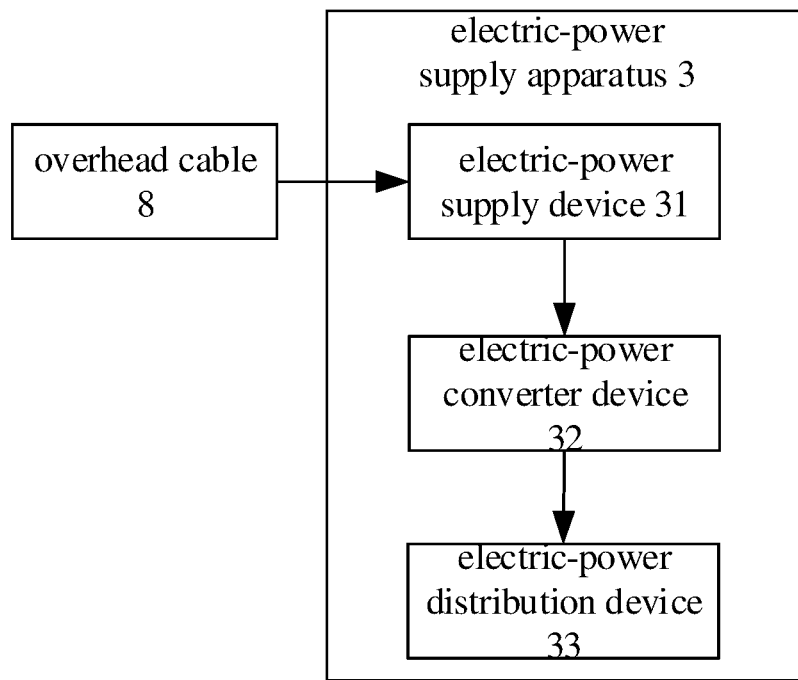
FIG. 8 schematically illustrates a connection relationship between an overhead cable and the electric-power supply apparatus according to the embodiments of the present disclosure.
Figure 9:
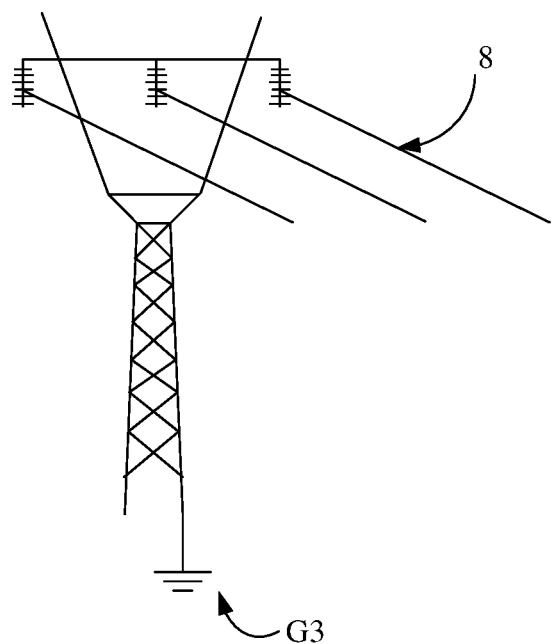
FIG. 9 schematically illustrates the overhead cable according to the embodiments of the present disclosure.
Figure 10:
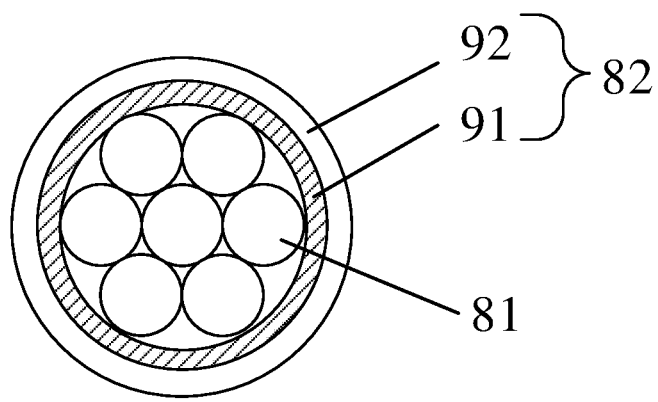
FIG. 10 schematically illustrates an exemplary structure of the overhead cable according to the embodiments of the present disclosure.

FIG. 8 schematically illustrates a connection relationship between an overhead cable and the electric-power supply apparatus according to the embodiments of the present disclosure. FIG. 9 schematically illustrates the overhead cable according to the embodiments of the present disclosure. FIG. 10 schematically illustrates an exemplary structure of the overhead cable according to the embodiments of the present disclosure.

For example, as shown in FIGS. 8 to 10, the fracturing well site system further includes an overhead cable 8, the overhead cable 8 is connected with the electric-power supply apparatus 3 and configured to supply power to the electric-power supply apparatus 3. The overhead cable 8 includes a conductive core 81 and a protective layer 82 wrapping the conductive core 81. For example, the protective layer 82 includes a shielding layer 91 close to the conductive core 81 and an insulating layer 92 far away from the conductive core 81. For example, the shielding layer 91 prevents the conductive core 81 from radiating electromagnetic energy outwardly and reduces the influence of an external electric field or magnetic field on the conductive wire core 81. For example, the shielding layer 91 comprises a metal mesh.

As shown in FIG. 9, the grounding system further includes a third grounding terminal G3, the third grounding terminal G3 is connected to the shielding layer 91 of the overhead cable 8 and configured to ground the shielding layer 91 of the overhead cable 8. The above-mentioned third grounding terminal G3 is spaced apart from the first grounding terminal G1 and the second grounding terminal G2, that is, the first grounding terminal G1, the second grounding terminal G2 and the third grounding terminal G3 are not connected with each other; in this way, in the case that one of the three grounding terminal fails, the grounding effect of other grounding terminals is not affected, and the normal operation of the apparatus or device connected to other grounding terminals is ensured.

Returning to FIG. 1, the fracturing well site system further includes a lightning protection apparatus 6, the lightning protection apparatus 6 includes a main lightning protection apparatus 61, and the main lightning protection apparatus 61 is provided at a corner of the well site. As shown in FIG. 1, the main lightning protection apparatus 61 is provided at each of four corners of the well site. The main lightning protection apparatus 61 is preferably a lightning receptor apparatus for preventing direct lightning. The main lightning protection apparatus has an individual grounding component. For example, the grounding system includes a fourth grounding terminal G4 connected with the main lightning protection apparatus 61 and configured to ground the main lightning protection apparatus 61, and the fourth grounding terminal G4 is not connected with the first grounding terminal G1. Under lightning strikes, a current flows through the main lightning protection apparatus 61; in this case, because the main lightning protection apparatus 61 has the individual grounding terminal, other grounding terminals or grounding apparatuses are not affected.

In at least some embodiments, the lightning protection apparatus further comprises an auxiliary lightning protection apparatus provided on at least one of the electric-driven apparatus, the fuel-driven apparatus and the electric-power supply apparatus. For example, as shown in FIG. 1, the auxiliary lightning protection apparatus 62 is mounted on each of the electric-driven apparatuses 1, and the auxiliary lightning protection apparatus 63 is mounted on each of the fuel-driven apparatuses 2. Each of the auxiliary lightning protection apparatuses 62, 63 for example includes one or more of the "TM-CPD (Countcurrent Protective Device)", the lightning receptor apparatus and the surge protector. Different from the normal way of introducing the lightning current to the earth for lightning protection, the TM-CPD adopts the way of "upper neutralization and lower blocking", which prevents lightning from entering downwardly into the protection area to be protected, so that direct lightning does not fall into the area to be protected. The technical advantages of the TM-CPD are as follows: 1) the direct lightning does not fall into the area to be protected, and the TM-CPD is not the device of leading the direct lightning to the earth; 2) no electric-power is needed and no secondary problems are generated; 3) the grounding resistance is low, which is not more than 30Ω (ohm), for example the grounding resistance is 4Ω.

In FIG. 1, only the electric-driven apparatus 1 and the fuel-driven apparatus 2 are provided with the auxiliary lightning protection apparatus 62 and 63; it can be understood that the auxiliary lightning protection apparatus for example is also mounted on each of the electric-power supply device 31, the electric-power converter device 32 and the electric-power distribution device 33, and the embodiments of the present disclosure do not limit the arrangement mode of the auxiliary lightning protection apparatus.

As shown in FIG. 1, the auxiliary lightning protection apparatus 62 is grounded through the second grounding terminal G2 directly connected to the electric-driven apparatus 1. That is, the auxiliary lightning protection apparatus 62 and the electric-driven apparatus 1 are connected to the same second grounding terminal G2. Because the auxiliary lightning protection apparatus 62 does not need a separate grounding terminal, the total number of the grounding terminals is reduced, and the workload of the grounding operation is reduced. Similarly, the auxiliary lightning protection apparatus 63 and the fuel-driven apparatus 2 are connected to the same second grounding terminal G2.

In at least some embodiments, a height of the auxiliary lightning protection apparatuses 62, 63 relative to the ground is lower than a height of the main lightning protection apparatus 61 relative to the ground. When the lightning strikes, due to the higher height of the main lightning protection apparatus 61, the current generated by lightning is firstly introduced into the ground through the main lightning protection apparatus 61, thereby avoiding the impact of lightning on the auxiliary lightning protection apparatuses 62 and 63.

In the embodiments of the present disclosure, the first grounding terminal G1, the second grounding terminal G2, the third grounding terminal G3 and the fourth grounding terminal G4 are buried under the ground and made from the conductive material, and the conductive material is coated with an anti-corrosion coating. The following description will take the first grounding terminal G1 as an example.

Figure 11:
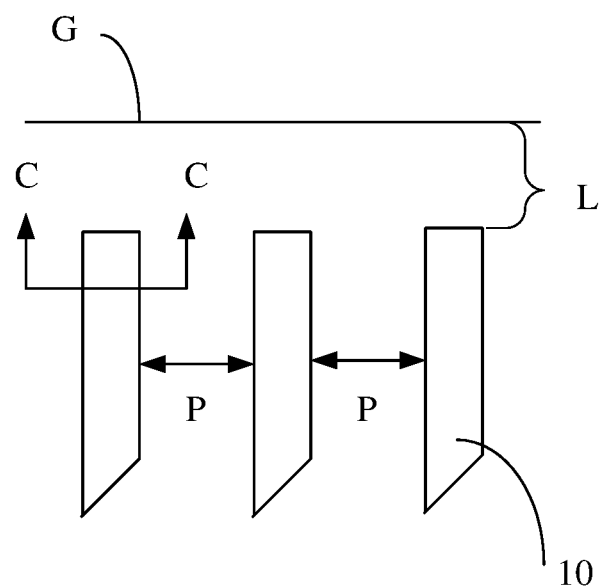
FIG. 11 schematically illustrates a first ground terminal according to the embodiments of the present disclosure.
Figure 12:
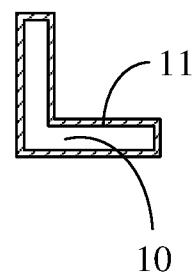
FIG. 12 is a cross-sectional view taken along a line CC of FIG. 11.

FIG. 11 schematically illustrates the first grounding terminal according to the embodiments of the present disclosure. FIG. 12 is a cross-sectional view taken along the CC line of FIG. 11.

For example, as shown in FIG. 11, the first grounding terminal G1 includes a grounding body 10 buried under the ground G. For example, the grounding body 10 adopts a 50 mm×50 mm×5 mm angle steel and is buried under the ground G in the vertical direction. The embodiments of the present disclosure do not specifically limit the total number of the grounding bodies 10, for example, the total number of the grounding bodies 10 is one or more. In the case that the grounding resistance does not meet the requirements of the well site, the total number of the grounding bodies are increased to reduce the resistance of the grounding resistance. For example, three grounding bodies 10 are provided at an equal interval. For example, a distance between any two adjacent grounding bodies 10 is equal to or greater than twice of a length of each of the grounding bodies 10. For example, the length of the grounding body 10 is 1.5 m, and the distance P between two adjacent grounding bodies 10 is 4 m-6 m, preferably 5 m. The buried depth of the top surface of grounding body (i.e. a distance from the ground G to the top surface of grounding body) should meet the design requirements. For example, the buried depth L of the top surface of the grounding body 10 is equal to or greater than 0.6 m, for example, 0.6 m to 1.2 m.

For example, as shown in FIG. 12, in order to prevent the surface of the grounding body 10 from being corroded, the surface of the grounding body 10 needs to undergo anti-corrosion treatment, for example, the surface of the grounding body 10 is coated with the anti-corrosion coating 11.

Figure 13:
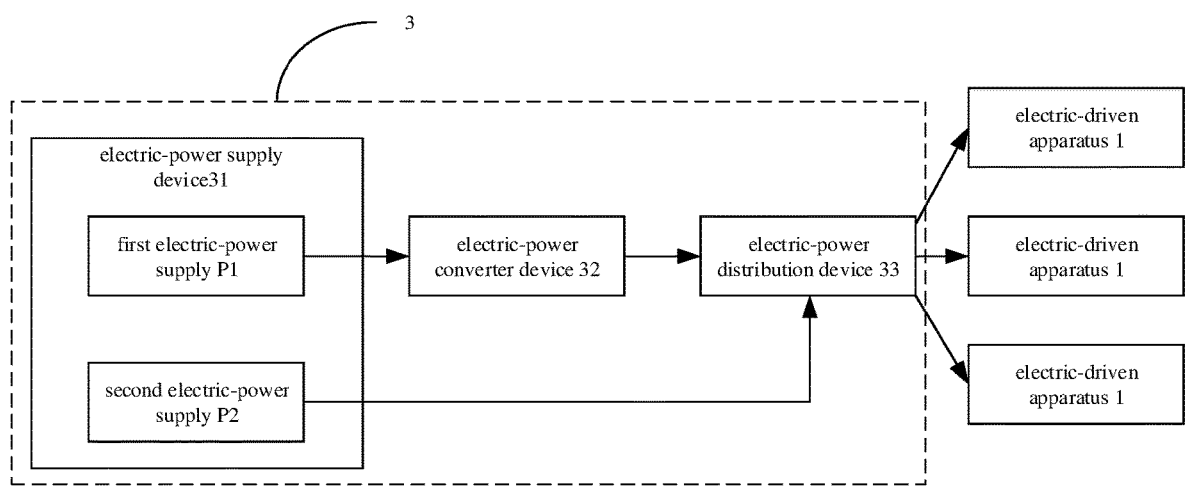
FIG. 13 schematically illustrates a connection relationship between the electric-power supply apparatus and an electric-driven apparatus according to the embodiments of the present disclosure.

FIG. 13 schematically illustrates a connection relationship between the electric-power supply apparatus and the electric-driven apparatus according to the embodiments of the present disclosure. For example, as shown in FIG. 13, the electric-power supply apparatus 3 includes the electric-power supply device 31, the electric-power converter device 32, and the electric-power distribution device 33. The electric-power supply device 31 includes a first electric-power supply P1 and a second electric-power supply P2. The first electric-power supply P1 is configured to provide a first voltage; the second electric-power supply P2 is configured to provide a second voltage. For example, both the first voltage and the second voltage are in the order of kilovolts, and the first voltage is higher than the second voltage. In actual production, the first voltage is not lower than 35 kv, and the second voltage is not lower than 10 kv.

In the embodiments of the present disclosure, the first electric-power supply P1 and the second electric-power supply P2 for example are connected to an external electric-power supply apparatus (such as the overhead cable); alternatively, the first electric-power supply P1 and the second electric-power supply P2 are a local electric-generator system or an electric-storage apparatus. The electric-generator for example is a gas turbine electric-generator or a diesel electric-generator. The electric-storage apparatus for example comprises a super-capacitor or other electric-storage elements.

As shown in FIG. 13, the first electric-power supply P1 is configured to transmit the first voltage to the electric-power converter device 32. The electric-power converter device 32 is electrically connected to the first electric-power supply P1. The electric-power converter device 32 is configured to compare the first voltage with a preset voltage, adjust the first voltage according to the comparison result, and transmit the first voltage after being adjusted to the electric-power distribution device 33. The electric-power distribution device 33 is electrically connected to the electric-power converter device 32 and is configured to distribute the electric-power to the plurality of electric-driven apparatuses 1.

For example, the first voltage provided by the first electric-power supply P1 is 35 kv and the power is 5 MVA. After the first voltage is input to the electric-power converter device 32, the electric-power converter device 32 compares the first voltage with the preset voltage (e.g., 10 kv). Because the first voltage is higher than the preset voltage, the electric-power converter device 32 converts the first voltage into 10 kv voltage, so that the high-voltage side voltage of the electric-power converter device 32 is 35 kv, the low-voltage side voltage of the electric-power converter device 32 is 10 kv, and the power is not less than 5 MVA. Subsequently, the electric-power converter device 32 transmits the first voltage after being adjusted to the electric-power distribution device 33. The electric-power distribution device 33 distributes the 10 kv voltage to the electric-driven apparatus at the well site. For example, the electric-power distribution device 33 adopts the mode of one input wire in combination with multiple output wires, and the power of each output wire is not less than 3 MVA.

As shown in FIG. 13, the electric-power distribution device 33 is further directly electrically connected to the second electric-power supply P2. The electric-power distribution device 33 is further configured to distribute the second voltage provided by the second electric-power supply P2 to the plurality of electric-driven apparatuses 1. For example, the second voltage provided by the second electric-power supply P2 is 10 kv; in this case, the second voltage is not needed to be converted before being input to the second electric-power supply P2, thereby reducing the total number of the electric-power converter devices.

In FIG. 13, it is shown that the electric-power supply device 31 includes the first electric-power supply P1 and the second electric-power supply P2; it can be understood that in other embodiments of the present disclosure, the electric-power supply device 31 for example only includes the first electric-power supply P1 or the second electric-power supply P2. In addition, the respective numbers of the first electric-power supply P1 and the second electric-power supply P2 are not limited to one, but may be two or more, which are selected by those skilled in the art according to actual requirements, and the embodiments of the present disclosure do not limit this.

Without conflict, various embodiments of the present disclosure and features in the embodiments can be combined with each other to obtain new embodiments.

The various components or structures in the drawings are not strictly drawn to actual scale, and the sizes of the various components or structures may be exaggerated or reduced for the sake of clarity, but these should not be used to limit the scope of the disclosure.

The foregoing embodiments merely are exemplary embodiments of the disclosure, and not intended to define the scope of the disclosure, and the scope of the disclosure is determined by the appended claims.

What is claimed is:

1. A fracturing system, comprising a plurality of electrical apparatuses, a plurality of fuel-driven apparatuses and a grounding system, wherein:
   the grounding system comprises a first grounding metal wire, a second grounding metal wire, and a first grounding terminal, the first grounding terminal being spaced from each of the electrical apparatus and the electric-power supply apparatus by one or more distances;
   each of the plurality of electrical apparatuses is connected to the first grounding metal wire and is connected to the first grounding terminal through the first grounding metal wire;
   each of the plurality of fuel-driven apparatuses is connected to the second grounding metal wire and is connected to the first grounding terminal through the second grounding metal wire; and
   the first grounding metal wire and the second grounding metal wire are connected to the first grounding terminal in parallel.

2. The fracturing system according to claim 1, wherein the one or more distances are 50 m to 5 km.

3. The fracturing system according to claim 1, further comprising an electric-power supply apparatus, wherein the electric-power supply apparatus is connected to the first grounding terminal.

4. The fracturing system according to claim 3, wherein:
   the electric-power supply apparatus comprises an electric-power supply device, an electric-power converter device electrically connected with the electric-power supply device, and an electric-power distribution device electrically connected with the electric-power converter device;
   the grounding system further comprises a third grounding metal wire; and
   at least one of the electric-power supply device, the electric-power converter device, and the electric-power distribution device is connected to the third grounding metal wire and is connected to the first grounding terminal through the third grounding metal wire.

5. The fracturing system according to claim 4, wherein: the third grounding metal wire is configured to surround at least one of the electric-power supply device, the electric-power converter device, or the electric-power distribution device; and
the third grounding metal wire is a closed wire loop.

6. The fracturing system according to claim 4, wherein the first grounding metal wire is connected between the third grounding metal wire and the first grounding terminal; and
at least one of the electric-power supply device, the electric-power converter device, and the electric-power distribution device is connected to the third grounding metal wire and is connected to the first grounding terminal through the third grounding metal wire and the first grounding metal wire.

7. The fracturing system according to claim 6, wherein: all of the electrical apparatus and the electric-power supply apparatus are connected to the first grounding terminal.

8. The fracturing system according to claim 7, wherein: the third grounding metal wire is configured to surround the electric-power supply device, the electric-power converter device, and the electric-power distribution device; and
the third grounding metal wire is a closed wire loop.

9. The fracturing system according to claim 1, wherein: the plurality of electrical apparatuses are disposed in at least two rows spaced apart from each other in a first direction;
each of the at least two rows comprises at least two electrical apparatuses provided in a second direction;
the first direction and the second direction are perpendicular to each other;
the plurality of fuel-driven apparatuses are disposed in at least two rows spaced apart from each other in the first direction; and
each of the at least two rows of fuel-driven apparatuses comprises at least two fuel-driven apparatuses provided in the second direction.

10. The fracturing system according to claim 9, wherein: the first grounding metal wire is located between the at least two rows of electrical apparatuses;
the second grounding metal wire is located between the at least two rows of fuel-driven apparatuses; and
the first grounding terminal is located between the first grounding metal wire and the second grounding metal wire.

11. The fracturing system according to claim 4, wherein: the first grounding wire, the second grounding wire, and the third grounding wire are provided on a ground level and comprise a flat-shaped structure of conductive material.

12. The fracturing system according to claim 1, wherein: the grounding system further comprises a plurality of second grounding terminal, and each of the second grounding terminals is directly connected with a respective one of the electrical apparatuses and is configured to ground the respective one of the electrical apparatuses.

13. The fracturing system according to claim 1, wherein: the fracturing system further comprises an auxiliary electrical apparatus connected to the first grounding terminal; and
the first grounding terminal is further configured to ground the auxiliary electrical apparatus.

14. The fracturing system according to claim 3, wherein: the fracturing system further comprises an overhead cable;
the overhead cable is connected with the electric-power supply apparatus and configured to provide power to the electric-power supply apparatus; and
the overhead cable comprises a conductive core and a protective layer wrapping the conductive core.

15. The fracturing system according to claim 14, wherein: the protective layer comprises a shielding layer;
the grounding system further comprises a third grounding terminal; and
the third grounding terminal is connected with the shielding layer of the overhead cable and configured to ground the shielding layer of the overhead cable.

16. The fracturing system according to claim 1, wherein: the electrical apparatuses comprise two or more of a frequency conversion apparatus, an electrical fracturing apparatus, an electrical sand mixing apparatus, an electrical sand transportation apparatus, an electrical meter, an electrical chemical additive apparatus, and an electrical proppant apparatus.

17. The fracturing system according to claim 1, comprising a fuel-driven apparatus, wherein:
the fuel-driven apparatus comprises two or more of a diesel-driven fracturing apparatus, a diesel-driven sand mixing apparatus, and a diesel-driven mixing apparatus.

18. The fracturing system according to claim 3, wherein: the electric-power supply apparatus comprises an electric-power supply device;
the electric-power supply device comprises at least one of a first electric-power supply and a second electric-power supply;
the first electric-power supply is configured to provide a first voltage;
the second electric-power supply is configured to provide a second voltage;
the first voltage and the second voltage are both in an order of kilovolts; and
the first voltage is larger than the second voltage.

19. The fracturing system according to claim 18, wherein: the electric-power supply apparatus further comprises an electric-power converter device electrically connected to the first electric-power supply;
the electric-power supply apparatus further comprises an electric-power distribution device electrically connected to the electric-power converter device and configured to distribute power to the electrical apparatus;
the first electric-power supply is configured to transmit the first voltage to the electric-power converter device; and
the electric-power converter device is configured to compare the first voltage with a preset voltage, adjust the first voltage according to a comparison result, and transmit the adjusted first voltage to the electric-power distribution device.

20. The fracturing system according to claim 19, wherein: the electric-power distribution device is directly electrically connected to the second electric-power supply; and
the electric-power distribution device is further configured to distribute the second voltage provided by the second electric-power supply to the electrical apparatus.

* * * * *